United States Patent
Shibata et al.

(10) Patent No.: US 10,406,939 B2
(45) Date of Patent: Sep. 10, 2019

(54) PNEUMATIC PRESSURE CONTROL METHOD FOR VEHICLE SEAT AND PNEUMATIC PRESSURE CONTROL DEVICE FOR VEHICLE SEAT

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Akiyoshi Shibata, Nagoya (JP); Yuki Fujii, Obu (JP); Hiroyuki Oda, Hamamatsu (JP); Shunsuke Hayakawa, Obu (JP); Shunsuke Tanaka, Nisshin (JP); Kenji Hashimoto, Nisshin (JP); Shinichiro Komaki, Toyota (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 145 days.

(21) Appl. No.: 15/467,232

(22) Filed: Mar. 23, 2017

(65) Prior Publication Data
US 2017/0274801 A1    Sep. 28, 2017

(30) Foreign Application Priority Data
Mar. 25, 2016  (JP) ................ 2016-062306

(51) Int. Cl.
*B60N 2/02* (2006.01)
*B60N 2/90* (2018.01)
*B60N 2/66* (2006.01)
*B60N 2/52* (2006.01)

(52) U.S. Cl.
CPC ............. *B60N 2/0244* (2013.01); *B60N 2/02* (2013.01); *B60N 2/914* (2018.02); *B60N 2/52* (2013.01); *B60N 2/66* (2013.01)

(58) Field of Classification Search
CPC .......... B60N 2/0244; B60N 2/02; B60N 2/44; B60N 2/52; B60N 2/66
USPC ................. 701/36, 48, 49; 297/217.2, 217.3, 297/344.12, 284.3, 284.6, 284.1, 354.12; 601/136
See application file for complete search history.

(56) References Cited

U.S. PATENT DOCUMENTS 6,203,105 B1 * 3/2001 Rhodes, Jr. .............. A47C 4/54
 297/284.6
6,422,087 B1 * 7/2002 Potter .................. B60N 2/0232
 73/731

(Continued)

FOREIGN PATENT DOCUMENTS

JP   2010-233897   10/2010
JP   2010-235021   10/2010

*Primary Examiner* — Thomas G Black
*Assistant Examiner* — Wae L Louie
(74) *Attorney, Agent, or Firm* — Oblon, McClelland, Maier & Neustadt, L.L.P.

(57) ABSTRACT

A pneumatic pressure control method for a vehicle seat includes: repeatedly detecting an internal pressure of a bladder provided inside the vehicle seat at intervals; correcting the internal pressure of the bladder based on a differential pressure between a detection value and a target value; and lengthening a detection interval to detect the internal pressure depending on a time elapsing from starting of the vehicle.

13 Claims, 5 Drawing Sheets

(56) References Cited

U.S. PATENT DOCUMENTS

| | | | |
|---|---|---|---|
| 2006/0061315 A1* | 3/2006 | Schmidt | B60N 2/0228 |
| | | | 318/568.1 |
| 2012/0086249 A1* | 4/2012 | Hotary | B60N 2/809 |
| | | | 297/284.3 |
| 2015/0210192 A1* | 7/2015 | Benson | B60N 2/914 |
| | | | 297/217.2 |
| 2016/0008206 A1* | 1/2016 | Devanaboyina | A47C 9/002 |
| | | | 601/136 |
| 2017/0037771 A1 | 2/2017 | Takagi et al. | |
| 2017/0043681 A1* | 2/2017 | Seiller | B60N 2/0248 |
| 2017/0274801 A1* | 9/2017 | Shibata | B60N 2/0244 |
| 2018/0111520 A1* | 4/2018 | Lem | B60N 2/914 |
| 2018/0178694 A1* | 6/2018 | McMillen | B60N 2/665 |

\* cited by examiner

PNEUMATIC PRESSURE CONTROL METHOD FOR VEHICLE SEAT AND PNEUMATIC PRESSURE CONTROL DEVICE FOR VEHICLE SEAT

INCORPORATION BY REFERENCE

The disclosure of Japanese Patent Application No. 2016-062306 filed on Mar. 25, 2016 including the specification, drawings and abstract is incorporated herein by reference in its entirety.

BACKGROUND

1. Technical Field

The present disclosure relates to a pneumatic pressure control method for a vehicle seat and a pneumatic pressure control device for a vehicle seat.

2. Description of Related Art

There is a seat device for a vehicle, the seat device being configured such that bladders provided inside a seat are inflated and deflated so that a support shape of the seat can be changed. That is, such a seat device includes an air intake and exhaust device configured to supply (fill) air into the bladders and to exhaust the air filled in the bladders therefrom. Further, in most cases, a pressure sensor is provided in a supply passage of the air with respect to the bladders. The operation of the air intake and exhaust device is controlled so that the internal pressures of the bladders, detected by use of the pressure sensor, reach their target values.

For example, a pneumatic pressure control device for a vehicle seat, as described in Japanese Patent Application Publication No. 2010-235021 (JP 2010-235021 A), is configured such that an air pump of its air intake and exhaust device works consecutively until the internal pressure of a bladder reaches a predetermined value, which is less than a target value. Further, after that, the air pump works intermittently until the internal pressure of the bladder reaches the target value. Note that, at this time, the detection of the internal pressure is performed during stop of the air pump. Hereby, the internal pressure of the bladder can be controlled more accurately.

SUMMARY

However, the internal pressure of the bladder provided inside the seat changes even after the air has been filled therein, for example, due to changes of a temperature or an atmospheric pressure in the vehicle where the seat is placed, an air leak (a leak within a tolerance range), or the like factor. In view of this, it is conceivable that the internal pressure of the bladder is detected repeatedly at intervals after the air has been filled into the bladder. By correcting the internal pressure of the bladder based on a differential pressure between the detection value and the target value, it is possible to maintain an optimum support shape.

However, at the time when the detection and correction of the internal pressure of the bladder is performed, operating noise, vibration, and the like of the air pump or a valve constituting the air intake and exhaust device become problems. Further, the internal pressure of the bladder decreases when an intake valve is opened to detect the internal pressure. On this account, it is desirable the frequency to detect the internal pressure of the bladder be restrained to be as small as possible. The increase in the operation frequency is also disadvantageous in the viewpoint of securing the durability of the air intake and exhaust device, and in this regard, there is still room for improvement.

The present disclosure provides a pneumatic pressure control method for a vehicle seat and a pneumatic pressure control device for a vehicle seat, each of which is able to restrain the operation frequency of an air intake and exhaust device and to maintain an internal pressure of a bladder appropriately.

A pneumatic pressure control method for a vehicle seat, according to a first aspect of the disclosure, includes: repeatedly detecting an internal pressure of a bladder provided inside the vehicle seat at intervals; correcting the internal pressure of the bladder based on a differential pressure between a detection value and a target value; and lengthening a detection interval to detect the internal pressure depending on a time elapsing from starting of the vehicle.

That is, after the starting of the vehicle, a large change is easily caused in a vehicle interior temperature due to the operation of an air-conditioning device. Accordingly, in such a state, when the internal pressure of the bladder is detected at a short interval, a change in the internal pressure of the bladder due to the temperature change can be corrected immediately. Further, the influence of a pressure change, an air leak (a leak within a tolerance range), or the like with respect to the internal pressure of the bladder is smaller than the influence of the temperature change with respect to the internal pressure of the bladder after the starting of the vehicle. On this account, even if the interval for the detection and correction of internal pressure is lengthened in consideration of the vehicle interior temperature that becomes stable with the course of time, it is possible to maintain the internal pressure of the bladder appropriately. This makes it possible to restrain the operation frequency of an air intake and exhaust device. As a result, the influence to a use sensation of a user, such as the occurrence of operating noise or vibration or the change of tactile impression, can be reduced. Further, it is possible to restrain a decrease in the internal pressure of the bladder along with the execution of the detection. By restraining the operation frequency, it is possible to secure higher durability.

In the above aspect, the lengthening of the detection interval to detect the internal pressure may include setting the detection interval to detect the internal pressure to a first interval until a predetermined time elapses from the starting of the vehicle, and setting the detection interval to detect the internal pressure to a second interval after the predetermined time has elapsed, the second interval being longer than the first interval.

With the above configuration, after the starting of the vehicle, which easily causes a large change in the vehicle interior temperature, the change in the internal pressure of the bladder due to the temperature change can be corrected immediately with a simple configuration. After the vehicle interior temperature is stabilized with the course of time, it is possible to restrain the operation frequency of the air intake and exhaust device and to maintain the internal pressure of the bladder appropriately.

A pneumatic pressure control device for a vehicle seat, according to a second aspect of the disclosure, includes: an internal pressure detecting portion configured to repeatedly detect an internal pressure of a bladder provided inside the vehicle seat at intervals; an internal pressure correcting portion configured to correct the internal pressure of the bladder based on a differential pressure between a detection value and a target value; and a detection interval change portion configured to lengthen a detection interval to detect the internal pressure depending on a time elapsing from starting of the vehicle.

In the above aspect, the detection interval change portion may include a first interval setting portion configured to set the detection interval to detect the internal pressure to a first interval until a predetermined time elapses from the starting of the vehicle, and a second interval setting portion configured to set the detection interval to detect the internal pressure to a second interval after the predetermined time has elapsed, the second interval being longer than the first interval.

A pneumatic pressure control method for a vehicle seat, according to a third aspect of the disclosure, includes: repeatedly detecting an internal pressure of a bladder provided inside the vehicle seat at intervals; correcting the internal pressure of the bladder based on a differential pressure between a detection value and a target value; detecting a vehicle interior temperature; and lengthening a detection interval to detect the internal pressure as a change amount of the vehicle interior temperature is smaller.

A pneumatic pressure control device for a vehicle seat, according to a fourth aspect of the disclosure, includes: an internal pressure detecting portion configured to repeatedly detect an internal pressure of a bladder provided inside the vehicle seat at intervals; an internal pressure correcting portion configured to correct the internal pressure of the bladder based on a differential pressure between a detection value and a target value; a temperature detecting portion configured to detect a vehicle interior temperature; and a second detection interval change portion configured to lengthen a detection interval to detect the internal pressure as a change amount of the vehicle interior temperature is smaller.

According to the present disclosure, it is possible to restrain the operation frequency of the air intake and exhaust device and to maintain the internal pressure of the bladder appropriately.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
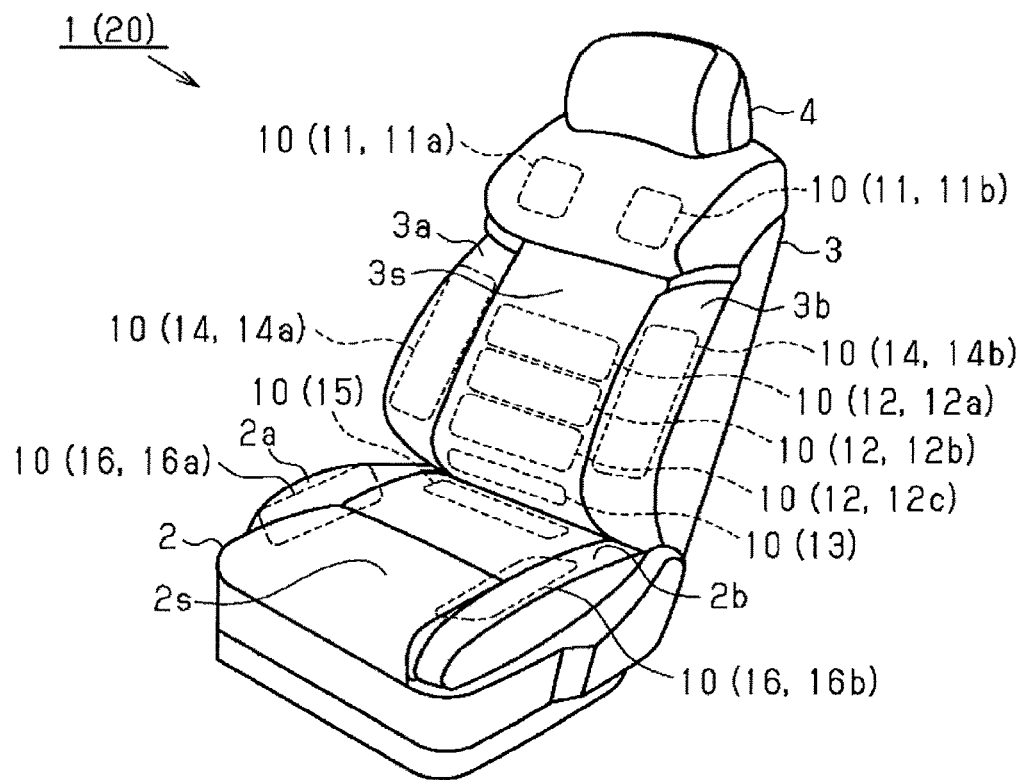
FIG. 1 is a perspective view of a vehicle seat including bladders provided therein.

The following describes one embodiment of a seat device having an air-operated seat support function and a pneumatic pressure control thereof with reference to the drawings. As illustrated in FIG. 1, a seat 1 for a vehicle includes a seat cushion 2, and a seatback 3 provided in a rear end of the seat cushion 2. A headrest 4 is provided on an upper end of the seatback 3.

Further, in the seat 1 of the present embodiment, the seatback 3 has a shape in which both side portions 3a, 3b project forward. Further, the seat cushion 2 also has a shape in which both side portions 2a, 2b project upward. The seat 1 of the present embodiment hereby can secure a good sitting posture of an occupant and maintain the sitting posture.

Further, the seat 1 is provided with a plurality of bladders 10 (11 to 16) inside the seat cushion 2 and the seatback 3. More specifically, in the seat 1 of the present embodiment, independent bladders 11 (11a, 11b), 12 (12a to 12c), 13, 14 (14a, 14b) are provided inside the seatback 3 at positions corresponding to shoulders, a lumbar, and its lower end (a back pelvis) of its back surface 3s, and the both side portions 3a, 3b, respectively. Further, the seat cushion 2 is also provided with independent bladders 15, 16 (16a, 16b) inside a rear end (a cushion pelvis) of its sitting face 2s and inside the both side portions 2a, 2b, respectively. Hereby, in the seat 1 of the present embodiment, a seat device 20 that can change a support shape of the seat 1 based on inflation and deflation of the bladders 10 is formed.

Figure 2:
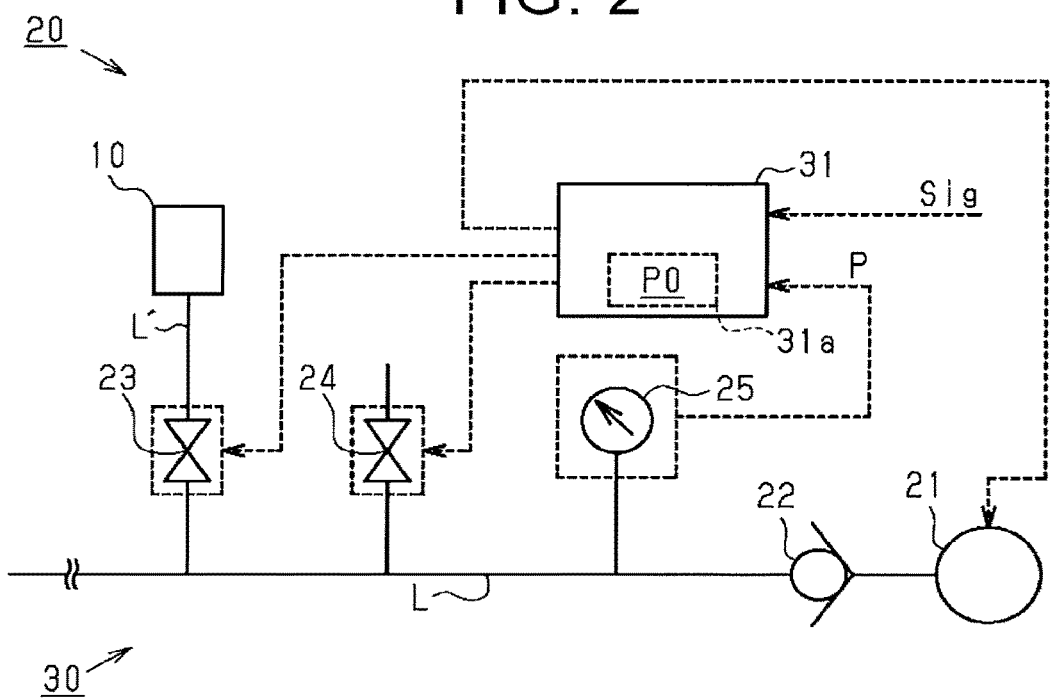
FIG. 2 is a schematic configuration diagram of a seat device.

More specifically, as illustrated in FIG. 2, the seat device 20 of the present embodiment includes an air pump 21 for force-feeding air to the bladders 10. Further, a passage L connecting the bladder 10 to the air pump 21 is provided with a check valve 22, an intake valve 23, an exhaust valve 24, and a pressure sensor 25. More specifically, in the seat device 20 of the present embodiment, the exhaust valve 24 and the pressure sensor 25 are provided at respective positions between the intake valve 23 and the check valve 22 in the passage L. Hereby, in the seat device 20 of the present embodiment, an air intake and exhaust device 30 that supplies (fills) the air to the bladders 10 and exhausts the air filled in the bladders 10 therefrom is formed.

Further more specifically, in the seat device 20 of the present embodiment, respective operations of the air pump 21, the intake valve 23, and the exhaust valve 24 are controlled by a control device 31. Further, the control device 31 detects an internal pressure P of the bladder 10 based on an output signal of the pressure sensor 25. Further, the control device 31 stores a target value (an internal pressure target value P0) in a memory area 31a about the internal pressure P of the bladder 10. Note that, in the seat device 20 of the present embodiment, the internal pressure target value P0 of the bladder 10 is updated such that an occupant sets an optimum support shape by use of an operation switch (not shown) provided in the seat 1 (a support shape adjustment control). The control device 31 of the present embodiment is configured to control the operations of the air pump 21, the intake valve 23, and the exhaust valve 24 that constitute the air intake and exhaust device 30, so that the detected internal pressure P of the bladder 10 reaches the internal pressure target value P0.

That is, at the time of detecting the internal pressure P of the bladder 10, the control device 31 of the present embodiment opens the intake valve 23 on a branch line L' communicating with the bladder 10 targeted for detection of internal pressure in a state where the exhaust valve 24 is closed. The seat device 20 of the present embodiment is configured such that the internal pressure P of the bladder 10 is hereby equivalent to a pneumatic pressure of the passage L provided with the pressure sensor 25.

Note that, in the seat device 20 of the present embodiment, the detection of internal pressure by use of the pressure sensor 25 is performed in a state where the intake valve 23 is opened for a given period of time. The control device 31 of the present embodiment performs an averaging process on an output signal of the pressure sensor 25 to be input during this period of time, so that the influence of disturbance along with vehicle travel is reduced, thereby making it possible to accurately detect the internal pressure P of the bladder 10.

Further, at the time of filling the air into the bladder 10, the control device 31 of the present embodiment drives the air pump 21 in a state where the intake valve 23 provided on the branch line L' of the target bladder 10 is opened and the exhaust valve 24 is closed. At the time of exhausting the air from the bladder 10, the intake valve 23 and the exhaust valve 24 are opened.

Figure 3:
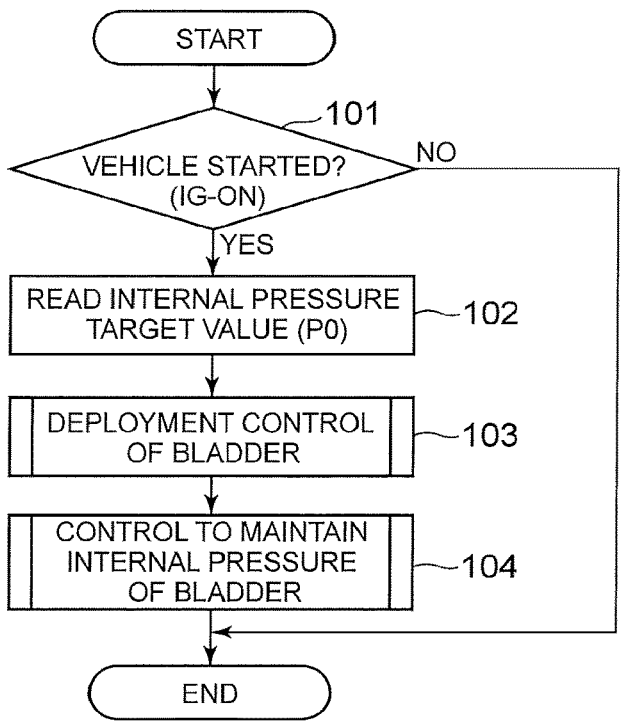
FIG. 3 is a flowchart illustrating a procedure of a control of internal pressures of the bladders.

As illustrated in the flowchart of FIG. 3, at the time of starting of the vehicle (step 101: YES), the control device 31 of the present embodiment reads respective internal pressure target values P0 of the bladders 10 from the memory area 31a (step 102), and the operation of the air intake and exhaust device 30 is controlled based on the internal pressure target values P0 in order to deploy the bladders 10 (a deployment control, step 103).

That is, the seat device 20 of the present embodiment is configured such that, after the vehicle stops (IG-off), all occupants have got off the vehicle, and in this state, the air in the bladders 10 is exhausted. Further, in the seat device 20 of the present embodiment, an ignition signal (an IG signal) Sig is input into the control device 31 as a signal indicative of the starting of the vehicle (see FIG. 2). Further, the control device 31 of the present embodiment stores therein respective internal pressure target values P0 of the bladders 10 provided independently. After the starting of the vehicle (IG-on), the control device 31 of the present embodiment fills the air into the bladders 10 until respective detected internal pressures P of the bladders 10 reach their corresponding internal pressure target values P0.

Further, in the seat device 20 of the present embodiment, after the bladders 10 are filled with the air by the deployment control after the starting of the vehicle, the control device 31 controls the operation of the air intake and exhaust device 30 in order to maintain the internal pressures P of the bladders 10 (an internal pressure maintaining control, step 104). The seat device 20 of the present embodiment can hereby stably hold an optimum support shape formed by the bladders 10 deployed inside the seat 1.

Figure 4:
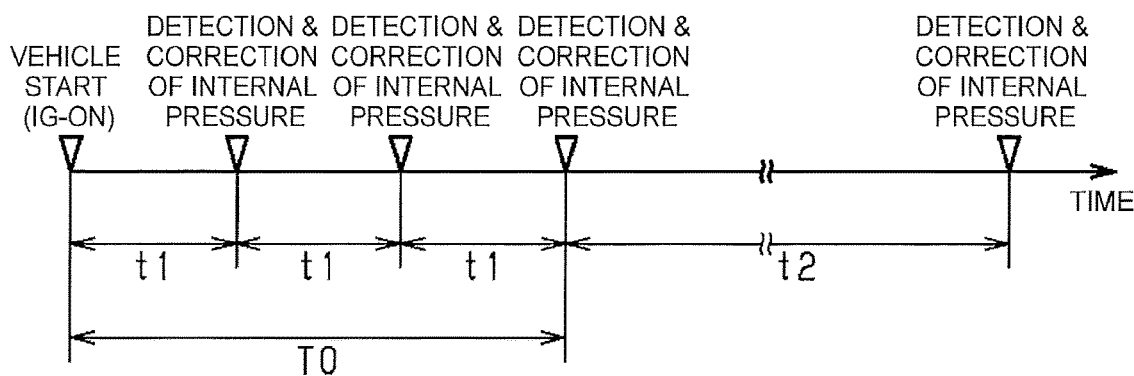
FIG. 4 is an explanatory view illustrating an aspect of a control to maintain the internal pressures of the bladders.

More specifically, as illustrated in FIG. 4, the control device 31 of the present embodiment repeatedly detects the internal pressures P of the bladders 10 at intervals, so as to execute the internal pressure maintaining control (see FIG. 3, step 104) on the bladders 10.

More specifically, the control device 31 of the present embodiment detects the internal pressures P of the bladders 10 at a predetermined first interval t1 (e.g., around 5 minutes) until a predetermined time T0 (e.g., around 15 minutes) elapses from the starting of the vehicle (IG-on).

Further, after the predetermined time T0 has elapsed from the starting of the vehicle, the control device 31 detects respective internal pressures P of the bladders 10 at a second interval t2 (e.g., around 60 minutes), which is longer than the first interval t1. When a detection value of the internal pressure P deviates from its internal pressure target value P0 at each internal pressure detection timing, the control device 31 of the present embodiment controls the operation of the air intake and exhaust device 30 so as to correct the internal pressure P of the bladder 10.

That is, after the starting of the vehicle, a vehicle interior temperature easily changes due to the operation of an air-conditioning device. For example, in the winter when the temperature is low, the inside of the vehicle is warmed rapidly by heating. Further, in the summer when the temperature is high, the inside of the vehicle is cooled rapidly by cooling. The internal pressures P of the bladders 10 tend to be easily affected largely by the change in atmospheric temperature of the seat 1 provided with the bladders 10, that is, the vehicle interior temperature.

Based on this point, the control device 31 of the present embodiment sets an interval (a detection interval tx) to detect the internal pressures P of the bladders 10 to a relatively short first interval t1 (tx=t1) until the predetermined time T0 elapses from the starting of the vehicle (T<T0), during which the vehicle interior temperature easily changes largely. Further, after the predetermined time T0 has elapsed (T≥T0) from the starting of the vehicle, the vehicle interior temperature is stable, and therefore, the control device 31 sets the detection interval tx to detect the internal pressures P to a longer second interval t2 (tx=t2). Thus, the control device 31 of the present embodiment lengthens the detection interval tx to detect the internal pressures P, depending on the time course from the starting of the vehicle, thereby making it possible to restrain the operation frequency of the air intake and exhaust device 30 and to maintain the internal pressures P of the bladders 10 appropriately.

Figure 5:
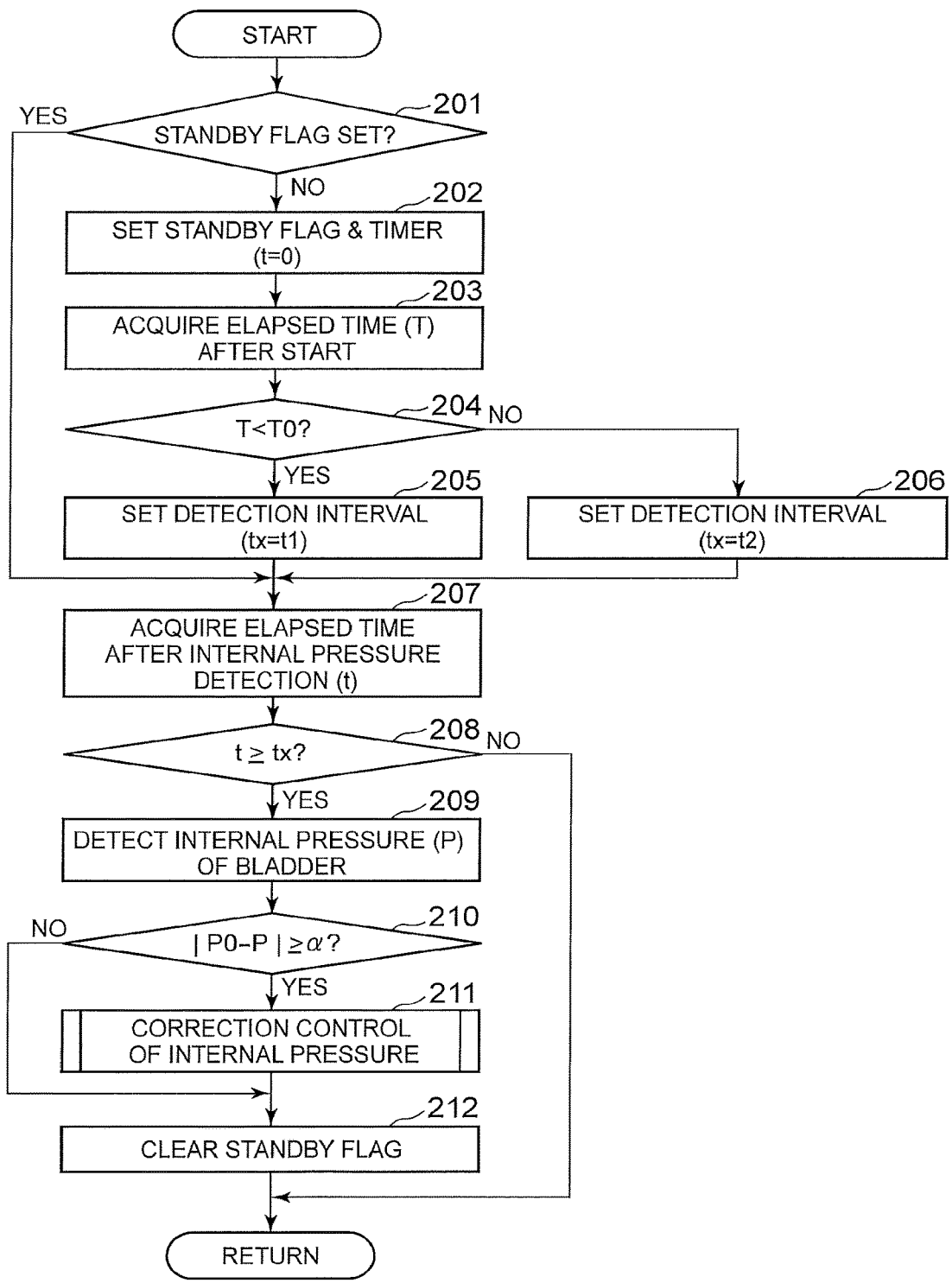
FIG. 5 is a flowchart illustrating a procedure of the control to maintain the internal pressures of the bladders.

Next will be described a procedure of the internal pressure maintaining control of the bladders 10 to be executed by the control device 31 of the present embodiment. As illustrated in the flowchart of FIG. 5, the control device 31 of the present embodiment first determines whether a standby flag indicating that it is currently between internal pressure detection timings of the bladders 10 is set or not (step 201). When the standby flag is not set (step 201: NO), the standby flag is set, and an interval timer that measures an execution timing of the detection of internal pressure is set (t=0, step 202).

Then, the control device 31 acquires an elapsed time T after the starting of the vehicle (step 203), and compares the elapsed time T with the predetermined time T0 set in advance (step 204). Before the predetermined time T0 elapses (T<T0, step 204: YES), the detection interval tx to detect the internal pressures P is set to the first interval t1 (tx=t1, step 205), and after the predetermined time T0 has elapsed (T≥T0, step 204: NO), the detection interval tx is set to the second interval t2 (tx=t2, step 206).

Note that the control device 31 of the present embodiment includes an exclusive timer that measures the elapsed time T after the starting of the vehicle. In step 201, when the standby flag has been already set (step 201: YES), the processes of step 202 to step 206 are not executed.

Subsequently, the control device 31 of the present embodiment acquires a measured value of the timer set together with the standby flag in step 202, i.e., an elapsed time t from a previous internal pressure detection timing (step 207), and determines whether or not the elapsed time t reaches the detection interval tx set in step 205 or step 206 (step 208). In a case where the elapsed time t reaches the detection interval tx (t tx, step 208: YES), respective internal pressures P of the bladders 10 are detected (step 209).

Further, in terms of each of the internal pressures P of the bladders 10 detected in step 209, the control device 31 of the present embodiment determines whether a differential pressure (|P0−P|) between the detection value (P) and the target value (P0) is a predetermined threshold α or more (step 210). When there is a bladder 10 in which the differential pressure between the detection value and the target value is the predetermined threshold α or more (|P0−P|≥α, step 210: YES), the operation of the air intake and exhaust device 30 is executed for this bladder 10 so as to correct the internal pressure P deviating from the target value (P0) (an internal pressure correction control, step 211).

That is, when the detected internal pressure P of the bladder 10 is lower than its internal pressure target value P0, the control device 31 of the present embodiment fills the air into the bladder 10, and when the detected internal pressure P of the bladder 10 is higher than its internal pressure target value P0, the control device 31 exhausts the air from the bladder 10. Note that the control device 31 of the present embodiment executes the detection of internal pressure and the internal pressure correction control sequentially on each of the bladders 10 (11 to 16) provided in the seat 1. Further, the control device 31 of the present embodiment does not perform the process of step 211 on a bladder 10 in which the differential pressure between the detection value of the internal pressure P and the target value is less than the predetermined threshold α (|P0−P|<α, step 210: NO) in step 210. Further, after the internal pressures P of the bladders 10 are detected in step 209, the standby flag is cleared regardless of whether the internal pressure correction control is executed or not in step 211 (step 212). When the elapsed time t from the previous internal pressure detection timing does not reach the detection interval tx set in step 205 or step 206 (t<tx, step 208: NO) in step 208, the processes of step 209 to step 212 are not executed.

According to the present embodiment, it is possible to yield the following effects. That is, after the starting of the vehicle, a large change is easily caused in the vehicle interior temperature due to the operation of the air-conditioning device (not shown). Accordingly, in such a state, the internal pressures P of the bladders 10 are detected at a short interval, so that a change in the internal pressures of the bladders 10 due to the temperature change can be corrected immediately. Further, the influence of a pressure change, an air leak (a leak within a tolerance range), or the like to the internal pressures P of the bladders 10 is smaller than the influence of the temperature change to the internal pressures P of the bladders 10 after the starting of the vehicle. On this account, even if the interval for the detection and correction of internal pressure is lengthened in consideration of the vehicle interior temperature that becomes stable with the course of time, it is possible to maintain the internal pressures P of the bladders 10 appropriately. This makes it possible to restrain the operation frequency of the air intake and exhaust device 30. As a result, the influence to a use sensation of a user, such as the occurrence of operating noise or vibration or the change of tactile impression, can be reduced. Further, it is possible to restrain a decrease in the internal pressures of the bladders 10 along with the execution of the detection. By restraining the operation frequency, it is possible to secure higher durability The detection interval tx to detect the internal pressures P of the bladders 10 is set to the first interval t1 (tx=t1) until the predetermined time T0 elapses from the starting of the vehicle (T<T0), and after the predetermined time T0 has elapsed (T≥T0), the detection interval tx to detect the internal pressures P is set to the second interval t2 (tx=t2), which is longer than the first interval t1.

With the above configuration, after the starting of the vehicle, which easily causes a large change in the vehicle interior temperature, the change in the internal pressures of the bladders 10 due to the temperature change can be corrected immediately with a simple configuration. After the vehicle interior temperature is stabilized with the course of time, it is possible to restrain the operation frequency of the air intake and exhaust device 30 and to maintain the internal pressures P of the bladders 10 appropriately.

Note that the above embodiment can be modified as follows. The number of bladders 10 to be provided inside the seat 1 and their arrangement may be changed optionally. The configuration of the air intake and exhaust device 30 such as the number of air pumps 21, intake valves 23, and exhaust valves 24 and their arrangements or presence or absence of the check valve 22 can be changed optionally.

Figure 6:
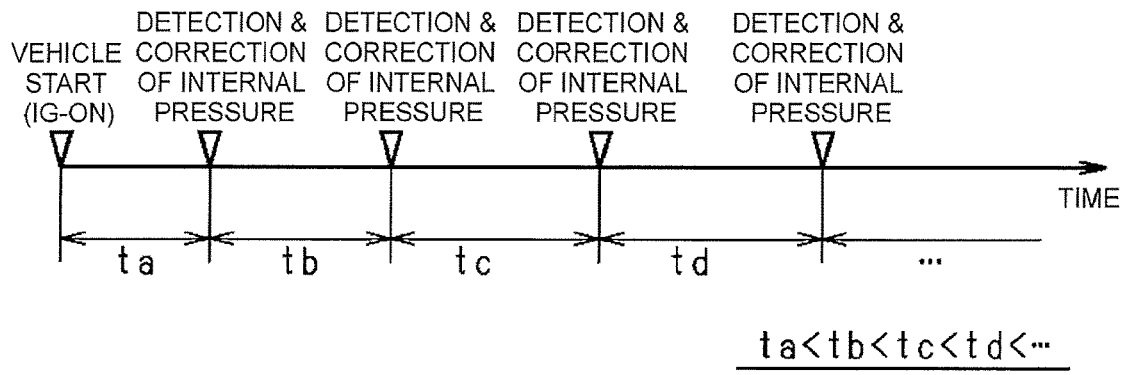
FIG. 6 is an explanatory view illustrating an aspect of another example of the control to maintain the internal pressures of the bladders.

In the above embodiment, before or after the predetermined time T0 elapses from the starting of the vehicle, the detection interval tx to detect the internal pressures P of the bladders 10 is changed (tx=t1 or tx=t2). Alternatively, for example, as illustrated in FIG. 6, every time the detection (and correction) of the internal pressures of the bladders 10 is executed, the detection interval tx may be lengthened (tx=ta<tb<tc<td . . . ). Even with such a configuration, it is possible to restrain the operation frequency of the air intake and exhaust device 30 and to maintain the internal pressures P of the bladders 10 appropriately.

Further, in terms of the detection of the internal pressures of the bladders 10, the predetermined time T0 from the starting of the vehicle at which the detection interval tx is changed is not necessarily a prescribed value determined in advance, but may be a value to be set based on the change of the vehicle interior temperature after the starting of the vehicle. The elapse of the predetermined time T0 after the starting of the vehicle may be recognized subsequently.

Figure 7:
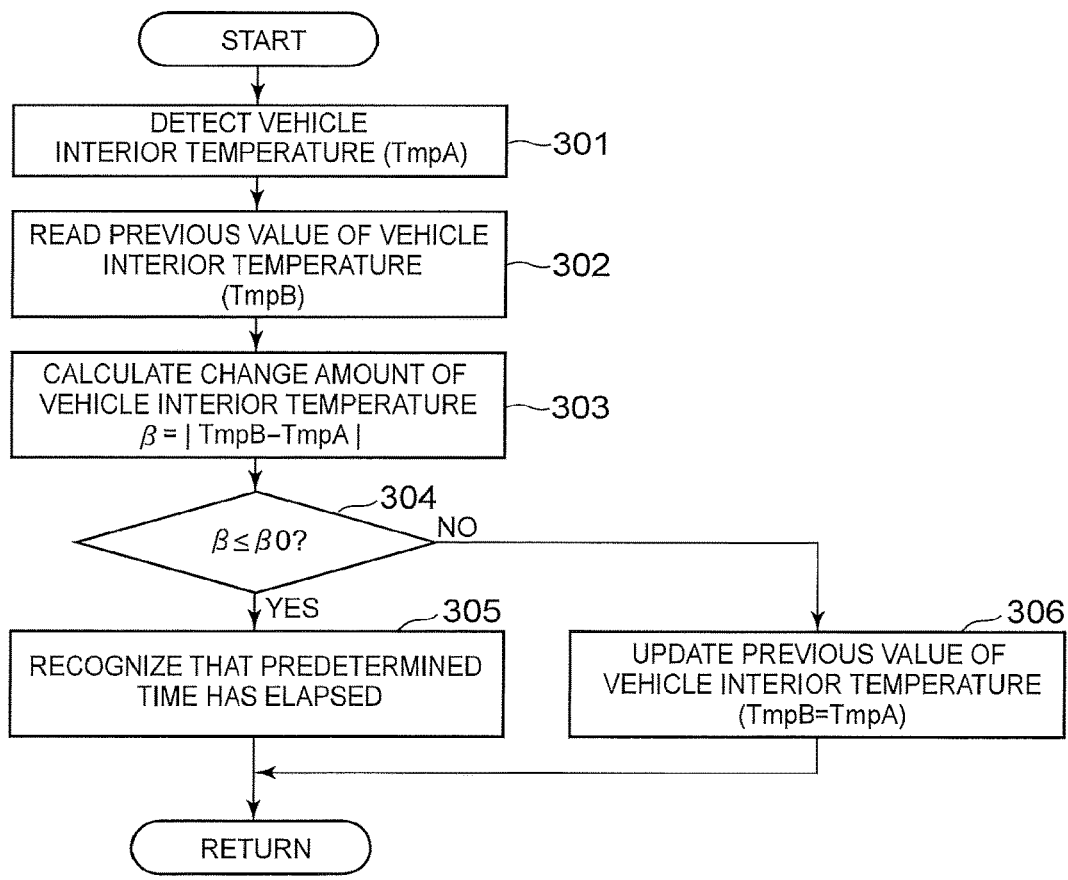
FIG. 7 is a flowchart illustrating an aspect of another example of the control to maintain the internal pressures of the bladders.

For example, as illustrated in the flowchart of FIG. 7, the control device 31 detects a vehicle interior temperature TmpA (step 301) and reads, from the memory area 31a, a previous value (a vehicle interior temperature previous value TmpB) of the vehicle interior temperature TmpA detected in a previous operation period (step 302). Subsequently, the control device 31 calculates a vehicle interior temperature change amount β by taking a difference (an absolute value) between the vehicle interior temperature TmpA and the vehicle interior temperature previous value TmpB (β=|TmpB−TmpA|, step 303), and determines whether or not the vehicle interior temperature change amount β is a predetermined threshold β0 or less (step 304). When the vehicle interior temperature change amount β is the predetermined threshold β0 or less (β≤β0, step 304: YES), it is recognized that the predetermined time T0 has elapsed from the starting of the vehicle (recognition of elapse of predetermined time, step 305).

Note that, in step 304, when the vehicle interior temperature change amount β is larger than the predetermined threshold β0 (β>β0, step 304: NO), step 305 is not executed. The vehicle interior temperature previous value TmpB is then updated to the vehicle interior temperature TmpA (a present value) detected in step 301 (TmpB=TmpA, step 306). With such a configuration, it is possible to more appropriately restrain the operation frequency of the air intake and exhaust device 30 and to maintain the internal pressures P of the bladders 10.

Figure 8:
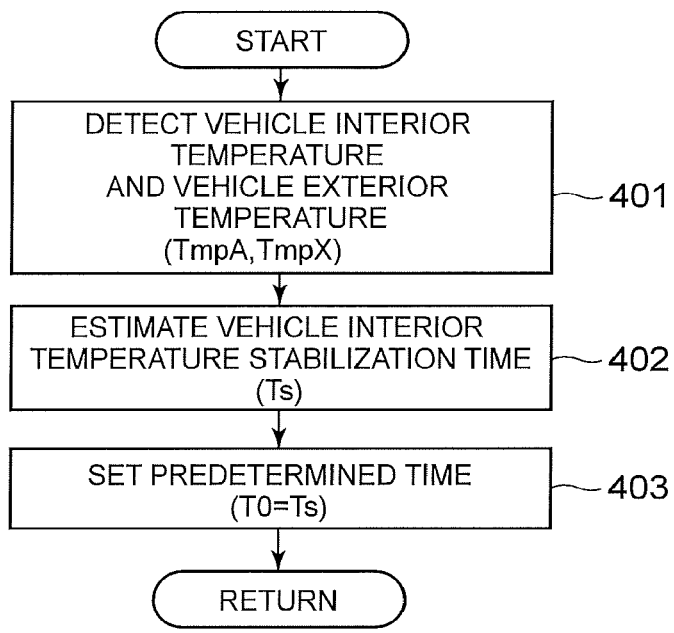
FIG. 8 is a flowchart illustrating an aspect of another example of the control to maintain the internal pressures of the bladders.

Further, as illustrated in the flowchart of FIG. 8, a vehicle interior temperature TmpA and a vehicle exterior temperature TmpX are detected (step 401), and based on the vehicle interior temperature TmpA and the vehicle exterior temperature TmpX and the operation state (and performance) of the air-conditioning device, a necessary time Ts to stabilize the vehicle interior temperature TmpA (e.g., $\beta \leq \beta 0$) is estimated (stabilization estimation, step 402). Note that an estimating method of the necessary time Ts to stabilize the vehicle interior temperature TmpA may be changed optionally to a method that does not use the vehicle exterior temperature TmpX, and the like method, for example. The necessary time Ts thus estimated may be set as the predetermined time T0 (T0=Ts, step 403). Even with such a configuration, it is possible to more appropriately restrain the operation frequency of the air intake and exhaust device 30 and to maintain the internal pressures P of the bladders 10.

Figure 9:
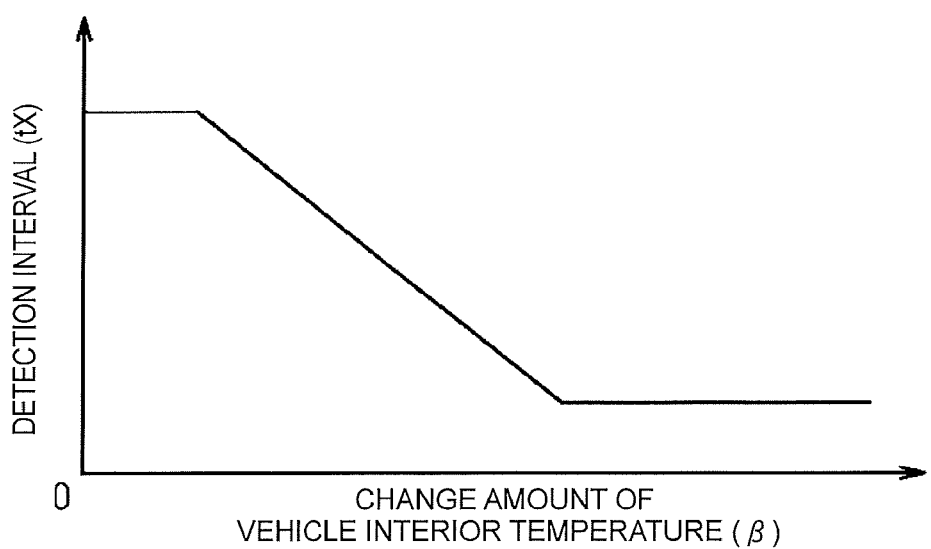
FIG. 9 is an explanatory view illustrating an aspect of another example of the control to maintain the internal pressures of the bladders.

Further, as illustrated in FIG. 9, a vehicle interior temperature change amount $\beta$ is calculated by taking a difference (an absolute value) between the vehicle interior temperature TmpA (the present value) and the vehicle interior temperature previous value TmpB (see FIG. 7, step 303). Then, the detection interval tx to detect the internal pressures P of the bladders 10 may be set based on the vehicle interior temperature change amount $\beta$. That is, the detection interval tx is set longer as the vehicle interior temperature change amount $\beta$ is smaller. Even with such a configuration, it is possible to more appropriately restrain the operation frequency of the air intake and exhaust device 30 and to maintain the internal pressures P of the bladders 10.

In the above embodiment and modifications, the control device 31 controls the operation of the air intake and exhaust device 30 so as to function as an internal pressure detecting portion, an internal pressure correcting portion, a detection interval change portion, a first interval setting portion, a second interval setting portion, a temperature detecting portion, a predetermined-time elapse recognition portion, a stabilization estimation portion, and a second detection interval change portion. Alternatively, these function controlling portions may be constituted by a plurality of control devices.

The following describes a technical idea that can be understood from the above embodiment, as well as effects. A pneumatic pressure control method for a vehicle seat is characterized by including a step of detecting a vehicle interior temperature, and a step of recognizing that the predetermined time has elapsed when the vehicle interior temperature is stabilized.

The pneumatic pressure control method for the vehicle seat is characterized by including a step of estimating a necessary time to stabilize the vehicle interior temperature after starting of the vehicle, and a step of setting the necessary time thus estimated as the predetermined time.

The pneumatic pressure control method for the vehicle seat is characterized by including a step of detecting a vehicle interior temperature, and a step of lengthening a detection interval to detect the internal pressure as a change amount of the vehicle interior temperature is smaller. With the above configurations, it is possible to more appropriately restrain the operation frequency of the air intake and exhaust device and to maintain the internal pressures of the bladders.

A pneumatic pressure control device for a vehicle seat is characterized by including a temperature detecting portion configured to detect a vehicle interior temperature, and a predetermined-time elapse recognition portion configured to recognize that the predetermined time has elapsed when the vehicle interior temperature is stabilized.

The pneumatic pressure control device for the vehicle seat is characterized by including a stabilization estimation portion configured to estimate a necessary time to stabilize the vehicle interior temperature after starting of the vehicle, and a predetermined-time setting portion configured to set the necessary time thus estimated as the predetermined time.

The pneumatic pressure control device for the vehicle seat is characterized by including a temperature detecting portion configured to detect a vehicle interior temperature, and a second detection interval change portion configured to lengthen a detection interval to detect the internal pressure as a change amount of the vehicle interior temperature is smaller.

What is claimed is:

1. A pneumatic pressure control method for a vehicle seat, comprising:
   repeatedly detecting an internal pressure of a bladder provided inside the vehicle seat in a state where an intake valve provided between the bladder and an air pump is opened and an exhaust valve is closed at intervals;
   correcting the internal pressure of the bladder based on a differential pressure between a detection value and a target value; and
   lengthening a detection interval to detect the internal pressure depending on a time elapsing from starting of the vehicle.

2. The pneumatic pressure control method according to claim 1, wherein
   the lengthening of the detection interval to detect the internal pressure includes setting the detection interval to detect the internal pressure to a first interval until a predetermined time elapses from the starting of the vehicle, and setting the detection interval to detect the internal pressure to a second interval after the predetermined time has elapsed, the second interval being longer than the first interval.

3. The pneumatic pressure control method according to claim 2, further comprising:
   detecting a vehicle interior temperature; and
   recognizing that the predetermined time has elapsed when the vehicle interior temperature is stabilized.

4. The pneumatic pressure control method according to claim 2, further comprising:
   estimating a necessary time to stabilize the vehicle interior temperature after the starting of the vehicle; and
   setting the necessary time thus estimated as the predetermined time.

5. The pneumatic pressure control method according to claim 1, further comprising:
   detecting a vehicle interior temperature; and
   lengthening the detection interval to detect the internal pressure as a change amount of the vehicle interior temperature is smaller.

6. The pneumatic pressure control method according to claim 1, wherein
   a passage connecting the bladder to the air pump is provided with a check valve, the intake valve, the exhaust valve, and a pressure sensor, the exhaust valve and the pressure sensor being provided at respective positions between the intake valve and the check valve in the passage.

7. A pneumatic pressure control method for a vehicle seat, comprising:

repeatedly detecting an internal pressure of a bladder provided inside the vehicle seat in a state where an intake valve provided between the bladder and an air pump is opened and an exhaust valve is closed at intervals;

correcting the internal pressure of the bladder based on a differential pressure between a detection value and a target value;

detecting a vehicle interior temperature; and lengthening a detection interval to detect the internal pressure as a change amount of the vehicle interior temperature is smaller.

8. A pneumatic pressure control device for a vehicle seat, comprising:

an internal pressure detecting portion configured to repeatedly detect an internal pressure of a bladder provided inside the vehicle seat in a state where an intake valve provided between the bladder and an air pump is opened and an exhaust valve is closed at intervals;

an internal pressure correcting portion configured to correct the internal pressure of the bladder based on a differential pressure between a detection value and a target value; and a detection interval change portion configured to lengthen a detection interval to detect the internal pressure depending on a time elapsing from starting of the vehicle.

9. The pneumatic pressure control device according to claim 8, wherein the detection interval change portion includes a first interval setting portion configured to set the detection interval to detect the internal pressure to a first interval until a predetermined time elapses from the starting of the vehicle, and a second interval setting portion configured to set the detection interval to detect the internal pressure to a second interval after the predetermined time has elapsed, the second interval being longer than the first interval.

10. The pneumatic pressure control device according to claim 9, further comprising:

a temperature detecting portion configured to detect a vehicle interior temperature; and a predetermined-time elapse recognition portion configured to recognize that the predetermined time has elapsed when the vehicle interior temperature is stabilized.

11. The pneumatic pressure control device according to claim 9, further comprising:

a stabilization estimation portion configured to estimate a necessary time to stabilize the vehicle interior temperature after the starting of the vehicle; and a predetermined-time setting portion configured to set the necessary time thus estimated as the predetermined time.

12. The pneumatic pressure control device according to claim 8, further comprising:

a temperature detecting portion configured to detect a vehicle interior temperature; and a second detection interval change portion configured to lengthen the detection interval to detect the internal pressure as a change amount of the vehicle interior temperature is smaller.

13. A pneumatic pressure control device for a vehicle seat, comprising:

an internal pressure detecting portion configured to repeatedly detect an internal pressure of a bladder provided inside the vehicle seat in a state where an intake valve provided between the bladder and an air pump is opened and an exhaust valve is closed at intervals;

an internal pressure correcting portion configured to correct the internal pressure of the bladder based on a differential pressure between a detection value and a target value;

a temperature detecting portion configured to detect a vehicle interior temperature; and a second detection interval change portion configured to lengthen a detection interval to detect the internal pressure as a change amount of the vehicle interior temperature is smaller.

* * * * *